Nov. 15, 1960  J. BOCHAN  2,959,966
JOINING MEMBER FOR PROVIDING A FLEXIBLE CONNECTION
BETWEEN TWO RELATIVELY MOVABLE MEMBERS
Filed June 24, 1959  2 Sheets-Sheet 1

INVENTOR.
JOHN BOCHAN
BY Derek P Lawrence
HIS ATTORNEY

Nov. 15, 1960 J. BOCHAN 2,959,966
JOINING MEMBER FOR PROVIDING A FLEXIBLE CONNECTION
BETWEEN TWO RELATIVELY MOVABLE MEMBERS
Filed June 24, 1959 2 Sheets-Sheet 2
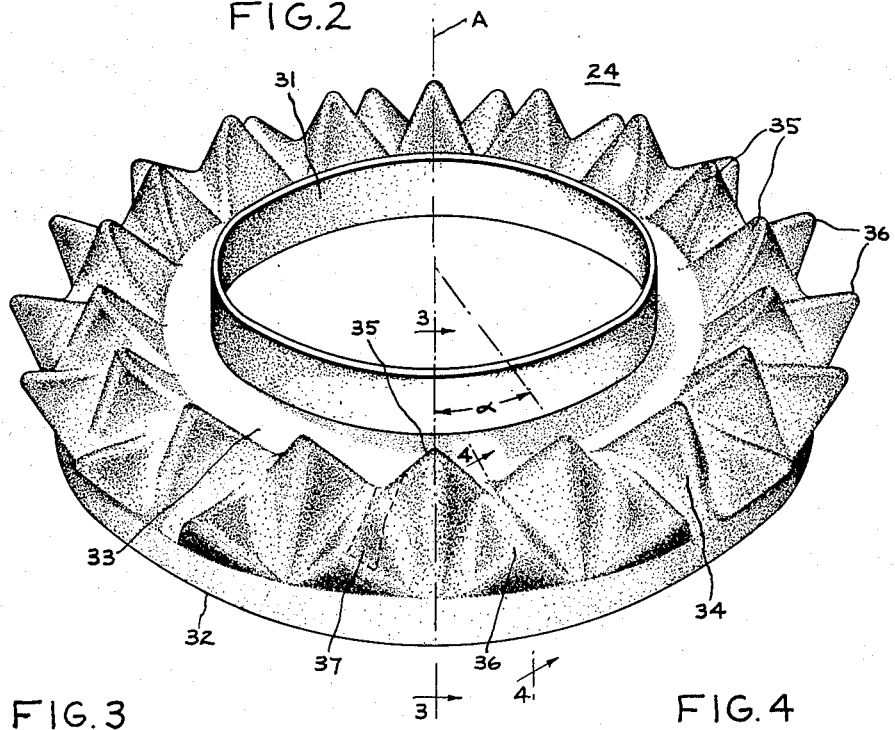
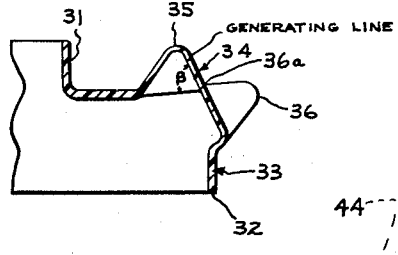
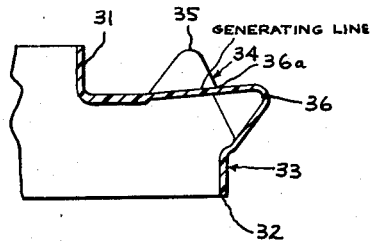
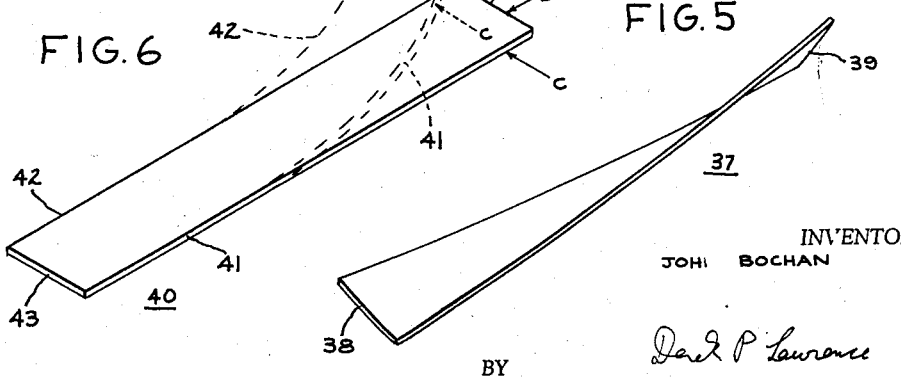
INVENTOR
JOHN BOCHAN
BY
HIS ATTORNEY United States Patent Office 2,959,966
Patented Nov. 15, 1960

2,959,966
JOINING MEMBER FOR PROVIDING A FLEXIBLE CONNECTION BETWEEN TWO RELATIVELY MOVABLE MEMBERS
John Bochan, Louisville, Ky., assignor to General Electric Company, a corporation of New York
Filed June 24, 1959, Ser. No. 822,493
9 Claims. (Cl. 74—18.1)

This invention relates to joining members, and more particularly to such a member arranged to provide a flexible joinder of two relatively movable members.

There are many applications where the joinder between two relatively movable parts must be provided by a member which is properly flexible so that it will not interfere with the relative motion between the parts. This is generally important both from the aspect of proper operation, and further from the aspect of undesirable wear on the flexible member since if it resists the movement of the relatively movable members it will necessarily have to undergo stresses substantially higher than those which would exist if it would flex properly for all directions of motion.

As a specific example of a need for true flexibility, clothes washing machines which centrifuge liquid out of the clothes by rotation of a suspended clothes basket must pass through a resonant speed at which maximum excursion of the clothes basket occurs. Damping means must be provided to limit this excursion, and since the forces causing the excursion increase as the rotational speed of the basket increases, it is most important to cause the machine to have a low resonant speed. Experimentation has shown that the stiffness of the flexible member joining the suspended parts of the machine to the frame has a substantial effect on the resonant speed, the speed increasing as the flexible member becomes stiffer. Consequently, the more the flexible member approaches true flexibility for all directions of force application, the better the performance of the washing machine, and the easier it is to design a damping system which will effectively prevent the vibrational forces from being transmitted to the casing of the machine.

Members provided with parallel folds, in the manner of an accordion, are often used for the purpose. While such members provide adequate flexibility in a direction at right angles to the folds, forces in a plane parallel to the folds meet a high resistance with the result that, in order for the flexible member to have an adequate life for the intended purpose, its manufacture is substantially more expensive than would otherwise be necessary. Also, of course, there is the factor that undesirable forces resisting the motion of the relatively movable members exist which cannot be avoided regardless of the care put into the manufacture of such a device.

It is therefore an important object of my invention to provide a joining member which will provide substantially complete flexibility, that is, lack of resistance for all directions of motion of the relatively movable members within the limits of their motion as externally determined.

A further object of my invention is to achieve this by providing a joining member which, between its two ends, includes a continuous section formed as a surface on which there cannot be drawn adjacent parallel lines. As will be further disclosed below this feature achieves the desired flexibility for all directions of motion.

In carrying out my invention in one form thereof, I provide a flexible joining device which has a continuous side wall. Each end of the member is adapted to be secured to a member, and the two members to which the flexible device is secured are movable relative to each other within predetermined limits. The securement of the flexible member is generally such as to provide a leak-proof connection between the two movable members. The specific feature of my invention lies in forming a continuous section of the side wall as a surface which is continuously changing in slope adjacent any line drawn thereon. By providing this type of structure, it has been found that virtually complete flexibility is obtained in the section which is formed as described, with the flexibility being present regardless of the direction of force applied as a result of the relative movement of the two members. The extent to which the section is caused to form a greater or lesser part of the side wall is, of course, a function of the maximum extent of motion between the two members that occurs, with the section necessarily being large enough to accommodate whatever extent of motion between the two members will exist.

In the drawings, Figure 1 is a side elevational view of a typical machine, in this case a clothes washer, which has moving parts secured within a stationary frame and wherein one of the moving parts is connected to one of the stationary parts by the improved flexible member of my invention;

Figure 2 is a view in perspective of my improved flexible member;

Figure 3 is a view along line 3—3 of Figure 2;

Figure 4 is a view along line 4—4 of Figure 2;

Figure 1:
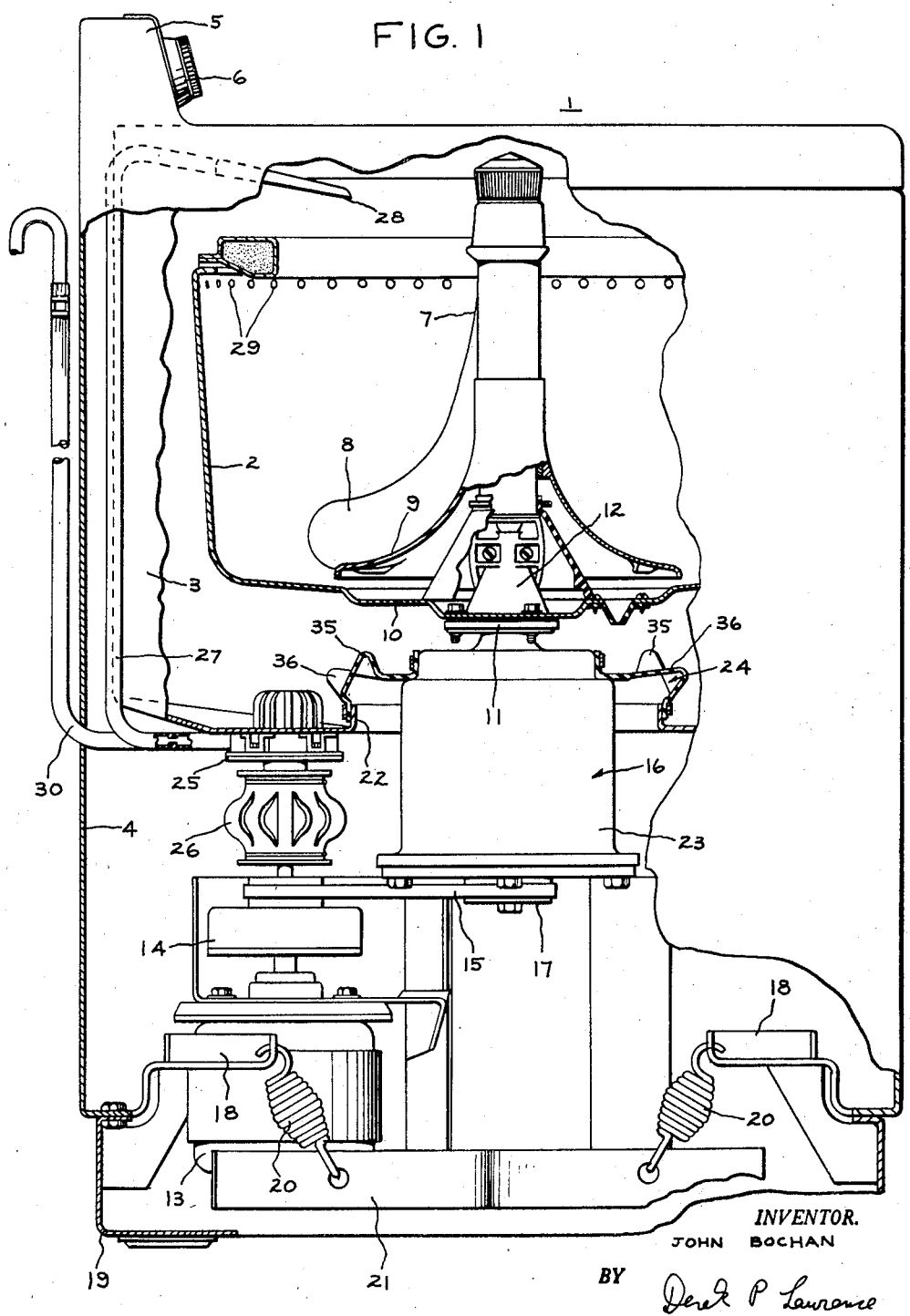

Figure 5 is an enlarged view in perspective of a fragment of the improved flexible member of Figure 2, which fragment is shown in phantom outline at the lower portion of Figure 2; and Figure 6 is a view in perspective of the strip of material of Figure 5 prior to the formation thereof shown in Figure 5, the view being provided for the purpose of explaining the basic concept behind the structure of Figure 2.

Referring now to Figure 1, I have shown therein a clothes washing machine 1 having a clothes basket 2 disposed within an outer imperforate tub 3. Tub 3 is preferably mounted within an appearance cabinet 4 which includes a control panel 5 and appropriate controls 6. At the center of the basket 2 there is positioned a vertical axis agitator 7 which includes vanes 8 and an outwardly and downwardly flared skirt 9 to which the vanes are joined at their lower ends. Both the clothes basket and the agitator 5 are rotatably mounted; the bottom 10 of the basket is mounted on a flange 11 of a rotatable hub 12, and the agitator 7 is mounted on a suitable shaft (not shown) which extends upwardly through hub 12. During the cycle of operation of the machine it is contemplated that the agitator will be oscillated back and forth within the basket 2 to wash and rinse clothes therein, and that after predetermined periods of the washing and rinsing action the basket 2 will be rotated at high speed to extract centrifugally the washing and rinsing liquids and discharge them into the outer tub 3. The basket 2 and agitator 7 may be driven by any suitable means such as, for instance, a reversible motor 13 which drives the basket and the agitator through a drive including a clutch 14 mounted on the motor shaft. The clutch allows the motor to start without load and then picks up the load as it comes up to speed. A suitable belt 15 transmits power to transmission assembly 16 through pulley 17. Thus, depending upon the direction of motor rotation, pulley 17 of transmission 16 is driven in opposite direction. The transmission 16 is so arranged that it supports and drives both the agitator drive shaft and the basket mounting hub 11. When motor 13 is rotated in one direction the transmission causes the agitator 7 to oscillate within the basket 2 and conversely when the motor 13 is driven in the opposite direction, the transmission drives the washing basket 2 and the agitator 7 together at high speed for centrifugal extraction.

Suitable brackets 18 are secured to the bottom 19 of cabinet 4; preferably three spaced brackets are so connected, two of them being shown in Figure 1. Each bracket has one end of a spring 20 connected thereto, the other end of each spring being connected to a mounting frame 21 on which motor 13, clutch 14, transmission 16, agitator 7 and basket 2 are all supported. Because of unbalances inherent in the components themselves and also because of unbalances in the distribution of clothes in basket 2, a substantial amount of movement of the suspended system occurs with respect to the stationary part which includes tub 3 and cabinet 4, particularly during centrifugal extraction. So that there will be a suitable leak-proof connection between the stationary tub 3 and basket 2 regardless of the clearance which must be provided between the inner flange 22 of the stationary tub and the casing 23 of transmission 16, a special flexible member 24 which constitutes my invention is provided.

Completing briefly the description of the illustrated structure in which my improved member is used, a pump 25 is mounted on the stationary tub 3 and is driven by motor 13 through a flexible connection 26. During rotation of the motor in the direction to cause agitator action, the pump returns water from the tub through a conduit 27 and a nozzle 28 to the basket 2 whence it overflows through openings 29 back into the tub to be recirculated. During extraction operations, the direction of pump rotation is such as to cause the liquid in tub 3 to be expelled from the machine through a drain hose 30.

Referring now primarily to Figures 2, 3 and 4 together with Figure 1, my improved flexible joining member, in the specific embodiment thereof which is appropriate for use in the washing machine of Figure 1, includes an upper inner ring-like edge 31 and an outer lower ring-like edge 32, edge 31 being intended to be securely clamped about the transmission cover 23 and edge 32 being adapted to be securely clamped about the tub edge 22 so as to provide a leak-proof relation between them and prevent water from escaping from the tub 3 down into the driving parts of the machine such as the clutch, motor, and transmission. The member 24 is necessarily formed of a flexible material, and, in the preferred embodiment, the material is formed from a somewhat resilient type of material which includes, for instance, soft rubber.

Between the edges 31 and 32, the device includes a side wall generally indicated at 33. The essence of my invention lies in the special formation of the surface of section 34 of side wall 33. While section 34 may, as shown, comprise a substantially major part of wall 33, it will be understood more clearly from the complete description of the invention that the size of the section 34 and the proportion it forms of side wall 33 are substantially dependent upon the extent of motion between the two relatively movable members to which it is secured (in this case transmission casing 16 and tub flange 22).

The section 34 of member 24 is, appearance-wise, formed of a series of inner tooth-like protuberances 35 and a series of outer tooth-like protuberances 36, the inner and outer teeth alternating around the periphery of wall section 34. The manner in which the surface of wall section 34 is formed to provide teeth 35 and 36 may best be understood by reference to Figures 3 and 4 in connection with Figure 2. The member 24 is formed substantially as an annulus having a center axis A (Figure 2). The surface 34 is formed by moving a generating line so that as it is moved around in a 360° circle it is continuously pivoted about point 36a to intersect axis A at different points. More specifically, for instance, as the generating line is moved through angle α (Figure 2) in the circumferential direction with respect to axis A of member 24, it is also pivoted up through angle β, angle β being taken relative to the plane in which angle α occurs (Figure 3), and then back down through angle β again. Figure 3 shows a point wherein the generating line is at the maximum angle β so as to form the apex of one of the inner teeth 35. Then, as the generating line turns through angle α, the generating line also pivots back down toward its starting point, thereby to form an outer tooth 36. It will readily be seen then, that as angle α increases further toward 360°, angle β will return from its minimum to its maximum again to form one of the inner teeth 35; this forming process continues around the full 360° to form a continuous section 34 of teeth 35 and 36. In the particular embodiment shown, angle β varies between approximately zero and 70° to the horizontal, but it will readily be understood that this is merely a preferred construction for a particular purpose. Also, while in the illustrated embodiment each point 34a falls on a plane circle drawn about axis A, the location of points 34a may vary both radially and in different planes as angle α increases, and the same general type of structure will be obtained.

Referring now to Figures 5 and 6 in connection with Figure 2, the basic aspects of the invention on which the particular formation of Figure 2 is based will be more fully described. As previously stated, Figure 5 is an enlarged view in perspective of a strip, designated by the numeral 37, taken at random on the surface of section 34. It will be seen that strip 37 is in effect the exact equivalent of an individual strip of flat flexible material whose ends 38 and 39 have been turned at a substantial angle to each other. Such a flat strip, from which strip 37 might originate, is shown in Figure 6 by the numeral 40; it will be readily seen that in its more basic aspect the strip 40 is formed of adjacent parallel lines; in this case, for practical purposes the two edges of the strip 41 and 42 will be referred to as the adjacent parallel lines.

When the strip is flat, as shown in Figure 6, there are two directions in which there is little or no flexibility. For instance, although holding strip 40 at end 43 and pushing down in the direction of arrow B would yield the desired flexibility, holding the strip as before and pushing in the direction of arrow C, so as to put the strip in shear, would not give a great deal of flexibility, if any at all. The same result of inflexibility is obtained if force is exerted in the direction of arrow D. Thus, suitable flexibility is obtained only in direction B and is not obtained in directions C and D.

Now, if strip 40 should be bent as shown in phantom outline in Figure 6, it will readily be seen that the desired flexibility is still obtained in the direction of arrow B. Further, there is now the advantage that a suitable amount of flexibility is obtained in the direction of arrow D. However, there is still the disadvantage, which can be serious if substantial forces in that direction are to be encountered, that there is virtually no flexibility at all if end 43 is held steady and the force is directed along arrow C. It will thus be observed that neither of the two formations of the strip 40, as shown in Figure 6 in solid outline and in phantom outline respectively, provides flexibility for all the possible directions in which forces may be applied. Where, as is the case in the machine of Figure 1, the transmission casing 23 may move in any direction with respect to tub flange 22, there will therefore frequently be exerted a force in direction C, and any possible inflexibility in any one direction will seriously impair the flexibilty of the device as a whole.

Returning now again to Figure 6, it will be observed that strip 40, in either of the positions shown in Figure 6, is formed of adjacent parallel lines (41 and 42). It is, in effect, a result of this relationship of lines 41 and 42 that there is a direction in which force may be applied with respect to which strip 40 will be relatively inflexible. This occurs when the force is applied in such a direction as to try to force one of the two parallel lines directly towards the other without any means whereby the other parallel line may yield in some manner.

It is this problem that is taken care of by forming a strip as shown in Figure 5. It can readily be ascertained by the simplest of experiments, with an ordinary thin strip of paper, that when ends 38 and 39 of strip 37 are turned with respect to each other, full flexibility in all directions of force is obtained. This is a direct result of eliminating from strip 37 the relationship of parallel lines. When the strip is formed as shown in Figure 5, there are no two adjacent lines which can be drawn parallel to each other because the strip is formed as a surface whose slope changes continuously adjacent any line drawn thereon.

Having determined the cause of inflexibility for certain directions of force application and the remedy therefor in a strip such as shown in Figure 5, Figure 2 then shows the application of this basic principle to make a complete member having the feature of high flexibility for any direction of force applied thereto. It can be seen, with strip 37 constituting one portion taken at random of section 34, that the entire section around the full 360° thereof is made up of adjacent strips such as strip 37, each one formed in the manner of strip 37. When all these strips are put together they have the common characteristic that there is no point on surface 34 whereon adjacent parallel lines may be drawn because the slope of the surface changes continuously adjacent any line drawn thereon. It is on this basic concept that section 34 of member 24 is formed. The procedure of varying angle $\beta$ back and forth between a maximum and a minimum through angle $\alpha$, and continuing this generating action through 360°, constitutes a preferred method of obtaining the proper relationship of the different parts of the surface of section 34.

It will readily be recognized that the specific construction of member 24 is but a single preferred embodiment of the basic aspects of my invention as clearly shown by reference to Figures 5 and 6. The important feature is that the surface 34 be formed to provide a continuously changing slope adjacent any line drawn thereon. This may be effected in various ways. Purely, as illustrative examples, a generating line always pointed at axis A, as shown, may be used; also, as a first minor variation, axis A may be located at points other than at the center of member 24 or may be located at changing points as different parts of section 34 are formed. Also, of course, while many applications will require a generally annular member with two open ends, as shown, it is readily conceivable that one end or both ends of the member may be closed and secured to a movable object, and such construction is also clearly within my invention.

It will thus be clear that while in accordance with the patent statutes I have described what at present is considered to be the preferred embodiment of my invention, it will be obvious to those skilled in the art that various changes and modifications, including those specifically mentioned above in addition to others, may be made therein without departing from the invention, and I therefore aim in the appended claims to cover all such changes and modifications as fall within the true spirit of this invention.

What I claim as new and desire to secure by Letters Patent of the United States is:

1. A flexible member formed of flexible material in sheet form, said member having a continuous side wall terminating in two opposite end sections adapted to be secured respectively to two spaced members movable relative to each other within predetermined limits thereby to provide a flexible connection between said movable members, said side wall including a continuous section formed as a surface which is continuously changing in slope adjacent any line drawn thereon.

2. The member defined in claim 1 wherein both ends thereof are open for connection to said two movable members.

3. The member defined in claim 1 wherein both said ends are open and said member is substantially annular in shape.

4. A flexible member formed of flexible material in sheet form, said member having a continuous side wall terminating in two opposite end sections adapted to be secured respectively to two spaced members movable relative to each other within predetermined limits by providing a flexible connection between said movable members, said side wall including a continuous section formed with a surface generated by movement in a closed path of a line whose angle to the plane of the path is being continually changed as it moves in the closed path, the resulting generated surface having the form of a series of angularly spaced smoothly curved tooth-like protuberances.

5. The apparatus defined in claim 4 wherein said member has both ends open.

6. A flexible member formed of flexible material in sheet form, said member having a continuous side wall terminating in two ends adapted to be secured respectively to two members movable relative to each other within predetermined limits thereby to provide a flexible connection between said movable members, said side wall including a continuous section whose surface is generated by movement of a straight line in a closed path, said straight line having a continually changing angle to the plane of said closed path as it moves in said closed path and being continuously pointed at a single line during its movement in said closed path, the resulting generated surface having the form of a series of angularly spaced smoothly curved tooth-like protuberances.

7. The member defined in claim 6 wherein both ends of said member are open.

8. A flexible member formed of flexible material in sheet form, said member having a continuous side wall terminiating in two open ends, said ends of said flexible member being adapted to be secured respectively to two members movable relative to each other within predetermined limits thereby to provide a flexible connection between said movable members, said side wall including a continuous section whose surface is generated by movement in a closed circular path of a line, said line having a continuous changing angle to the plane of said circular path as it moves in said circular path and being continuously directed to intersect the axis of said flexible member as it moves in said circular path, the resulting generated surface having the form of a series of angularly spaced smoothly curved tooth-like protuberances.

9. A ring-like flexible member formed of a sheet of flexible material so as to define a continuous ring-like side wall terminating in two opposite ring-like end sections adapted to be secured to two spaced members movable relative to each other within predetermined limits thereby to provide a flexible connection between said movable members, said side wall including a continuous section whose surface is generated by movement in a closed circular path of a line, said line continuously pivoting intermediate its ends relative to the plane of said circular path as it moves in said circular path, the resulting generated surface having the form of coaxial continuous rows of angularly spaced smoothly curved tooth-like protuberances, each protuberance of each said row being located angularly between two adjacent protuberances of the other of said rows.

References Cited in the file of this patent

UNITED STATES PATENTS 2,432,803    Rice                   Dec. 16, 1947
2,644,326    Worst                July 7, 1953